United States Patent
Wicks et al.

(10) Patent No.: US 10,060,385 B2
(45) Date of Patent: Aug. 28, 2018

(54) HYBRID COMPOSITE CYLINDER HEAD

(71) Applicant: FORD GLOBAL TECHNOLOGIES, LLC, Dearborn, MI (US)

(72) Inventors: Christopher Donald Wicks, Allen Park, MI (US); Mark Michael Madin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/730,779

(22) Filed: Oct. 12, 2017

(65) Prior Publication Data

US 2018/0030920 A1 Feb. 1, 2018

Related U.S. Application Data

(63) Continuation-in-part of application No. 14/619,496, filed on Feb. 11, 2015.

(51) Int. Cl.
| | |
|---|---|
| *F01L 3/04* | (2006.01) |
| *F02F 1/42* | (2006.01) |
| *F01L 1/344* | (2006.01) |
| *F02F 1/24* | (2006.01) |
| *F02F 1/26* | (2006.01) |

(52) U.S. Cl.
CPC .............. *F02F 1/4285* (2013.01); *F01L 3/04* (2013.01); *F01L 1/3442* (2013.01); *F01L 2001/34423* (2013.01); *F02F 1/26* (2013.01); *F02F 2001/248* (2013.01)

(58) Field of Classification Search
CPC .. F02F 1/4285; F02L 3/04; F02L 2001/34423
See application file for complete search history.

(56) References Cited

U.S. PATENT DOCUMENTS

| | | | |
|---|---|---|---|
| 4,003,422 A | 1/1977 | Schramm et al. | |
| 4,341,826 A | 7/1982 | Prewo et al. | |
| 4,785,773 A | 11/1988 | Schreiber et al. | |
| 4,852,542 A * | 8/1989 | Kamo ................ | F02B 77/02 123/188.3 |
| 5,083,537 A | 1/1992 | Onofrio et al. | |
| 5,384,200 A | 1/1995 | Giles et al. | |
| 5,540,553 A | 7/1996 | Goto et al. | |
| 5,638,779 A | 6/1997 | Atmur et al. | |
| 5,657,729 A | 8/1997 | Atmur et al. | |
| 5,730,096 A | 3/1998 | Atmur et al. | |
| 5,769,046 A | 6/1998 | Ransone | |
| 5,908,016 A | 6/1999 | Northam et al. | |
| 6,050,234 A | 4/2000 | Hannoosh | |
| 6,581,381 B2 | 6/2003 | Kim | |
| 2007/0163250 A1 | 7/2007 | Sane et al. | |

OTHER PUBLICATIONS ("How to Paint Your Engine Block", Gearhead Diva, May 21, 2014, Rachel De Barros, http://www.gearheaddiva.com/3711/how-to-paint-your-engine-block/.*

* cited by examiner

*Primary Examiner* — Kevin A Lathers
(74) *Attorney, Agent, or Firm* — Brooks Kushman P.C.

(57) ABSTRACT

An engine cylinder head includes an internal metal structure formed from a metal material, at least a portion of which includes a thermal coating and an external polymer composite structure formed from a polymer composite material, wherein the external polymer composite structure at least partially surrounds the internal metal structure.

19 Claims, 6 Drawing Sheets

HYBRID COMPOSITE CYLINDER HEAD

CROSS-REFERENCE TO RELATED APPLICATIONS

This application is a continuation-in-part of U.S. application Ser. No. 14/619,496 filed Feb. 11, 2015, now pending, the disclosure of which is hereby incorporated in its entirety by reference herein.

TECHNICAL FIELD

The invention is directed to components of an internal combustion engine, including a hybrid composite cylinder head having an internal metal structure and an external polymer structure.

BACKGROUND

Cylinder heads are typically made of metal such as aluminum or cast iron. Metal cylinder heads may suffer from one or more disadvantages. The cast iron cylinder heads are heavy and exhibit low thermal conductivity. Aluminum cylinder heads are more expensive to make. Moreover, some aluminum cylinder heads may exhibit inadequate corrosion resistance and unacceptable thermal expansion for certain applications. Alternatives to metal cylinder heads have been proposed. For example, partially ceramic cylinder heads or fiber reinforced ceramic matrix composite cylinder heads have been proposed. However, such cylinder heads may exhibit limited thermal and peak pressure carrying capabilities.

SUMMARY

An engine cylinder head comprising an internal metal structure formed from a metal material and an external polymer composite structure formed from a polymer composite material, wherein the external polymer composite structure at least partially surrounds the internal metal structure. The polymer composite material may include a fiber material. The internal metal structure may form an upper portion of a combustion chamber. The internal metal structure may form a combustion chamber insert. The internal metal structure may include a fire deck. The fire deck may include a plurality of engine coolant ports, a plurality of oil drain ports, or both. The inner portion may be made from cast iron. The external polymer composite structure may be made from a thermoset resin. The thermoset resin may include a polyester resin, an epoxy resin, a phenolic resin, a polyurethane, a polyimide, a silicone, or a combination thereof. The thermoset resin may be a polyester resin. The fiber material may include carbon fiber, aramid fiber, glass fiber, lignocellulosic fiber, chemically modified cellulose fiber, or a combination thereof. The external polymer composite structure may include one or more intake and exhaust oil feeds for a hydraulic lash adjuster. The external polymer composite structure may include one or more spark plug and direct injection pockets.

An engine cylinder head comprising an internal metal structure formed from a metal material and including a fire deck; an external polymer composite structure formed from a polymer composite material including a fiber material and including one or more intake and exhaust oil feeds for a hydraulic lash adjuster and one or more spark plug and direct injection pockets, wherein the external polymer composite structure at least partially surrounds the internal metal structure.

A method of forming an engine cylinder head comprising forming an internal metal structure of a metal material; and molding an external polymer composite structure of a polymer composite material over the internal metal structure so that the external polymer composite at least partially surrounds the inner metal structure. The polymer composite material may include a fiber material. The internal metal structure forming step may include casting the internal metal structure. The method may further comprise forming one or more components of the internal metal structure. The internal metal structure forming step may include machining one or more components of the internal metal structure. The method may further comprise adding a coating to a surface of the internal metal structure. The molding step may include injection molding or compression molding the external polymer composite structure.

DETAILED DESCRIPTION

Figure 1:
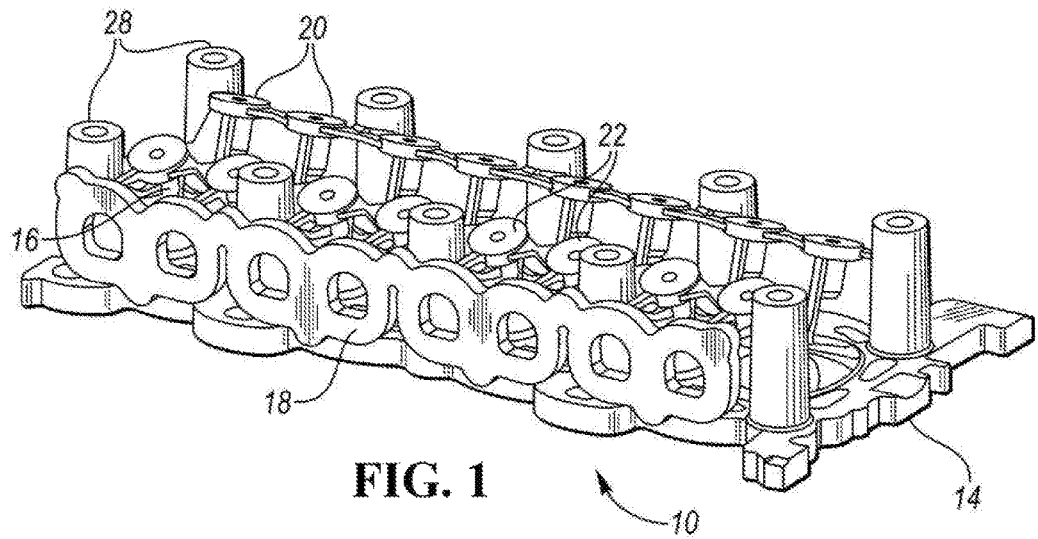
FIG. 1 depicts a perspective side view of an internal metal structure of a hybrid composite cylinder head according to one or more embodiments.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

An internal combustion engine includes an engine with one or more cylinders. Each of the cylinders is covered with a cylinder head which sits above each cylinder and on top of a cylinder block. The cylinder head closes at the top of the cylinder and thus forms a combustion chamber. In addition, the cylinder head provides space for the passages that feed air and fuel to the cylinder and allow exhaust to escape. The cylinder head may also be a suitable location to mount spark plugs, valves, and fuel injectors.

Cylinder heads are typically made from metal such as aluminum or cast iron. Potential disadvantages of cylinder heads made completely from cast iron include relatively high weight and low thermal conductivity. Aluminum cylinder heads are typically half the weight of an equivalent cast iron cylinder heads and about three times better in terms of thermal conductivity. However, aluminum cylinder heads may be too expense, provide insufficient corrosion resistance, may be too soft for certain applications, and may exhibit high thermal expansion. An alternative to the metal cylinder heads is a cylinder head partially formed from a ceramic material. For example, U.S. Pat. No. 5,657,729 discloses a metal heat sink coupled to an upper portion of the ceramic section within a combustion chamber. Additionally, U.S. Pat. No. 5,657,729 discloses a fiber reinforced ceramic matrix composite cylinder head and cylinder head liner. However, such composite cylinder heads have a limited thermal and peak pressure carrying capabilities. Additionally, ceramic materials cannot be molded around a metal skeleton of the cylinder head.

Therefore, there remains a need to develop a cylinder head which would contain the combustion pressure and thermal loading while being lightweight and thus contribute to better fuel efficiency. It is also desirable to provide a cylinder head which would have other advantages such as good corrosion resistance, thermal benefits, maintained rigidity, and/or reduced number of machine operations during production of the cylinder head.

Further, in addition to mass reduction, it would be highly desirable to provide a cylinder head with better thermal properties maintaining heat where desirable while the structure is not jeopardized by high temperatures.

A hybrid composite cylinder head as disclosed herein solves one or more problems described above and/or provides the benefits identified above. The hybrid composite cylinder head as disclosed herein is suitable for use in a variety of engines. For example, the hybrid composite cylinder head may be used in a gasoline direct injection engine and/or gasoline/diesel port fuel injection engine.

According to one or more embodiments, the hybrid composite cylinder head is capable of withstanding temperatures of 150° C. or less, 100° C. or less, 50° C. or less, 0° C. or less, −20° C. or less, −40° C. or less, −60° C. or less, or −80° C. or less. The hybrid composite cylinder head is capable of withstanding temperatures of 90° C. or more, 110° C. or more, 150° C. or more, 200° C. or more, 250° C. or more, 300° C. or more, or 350° C. or more. The hybrid composite cylinder head is capable of withstanding a coolant pressure of 0.5 bar or more, 0.75 bar or more, 1 bar or more, or 1.5 bar or more. The hybrid composite cylinder head is capable of withstanding a cylinder pressure of 50 bar or more, 75 bar or more, 100 bar or more, 125 bar or more, or 150 bar or more.

According to one or more embodiments, as shown in FIGS. 1-5, the hybrid composite cylinder head 100 includes an internal metal structure 10 and a composite material external structure 12. The hybrid composite cylinder head 100 has a relatively low weight compared to a metal cylinder head. The hybrid component cylinder head 100 offers additional advantages. For example, a combination of the internal metal structure 10 and the external polymer composite structure 12 allows for better organization of the complicated internal shape of the cylinder head 100. For instance, a coolant circuit of a composite cylinder head 100 is better organized in comparison to traditional metal cylinder heads. The hybrid composite cylinder head 100 allows for optimized heat transfer so that the heat is retained where it is desirable.

Figure 2:
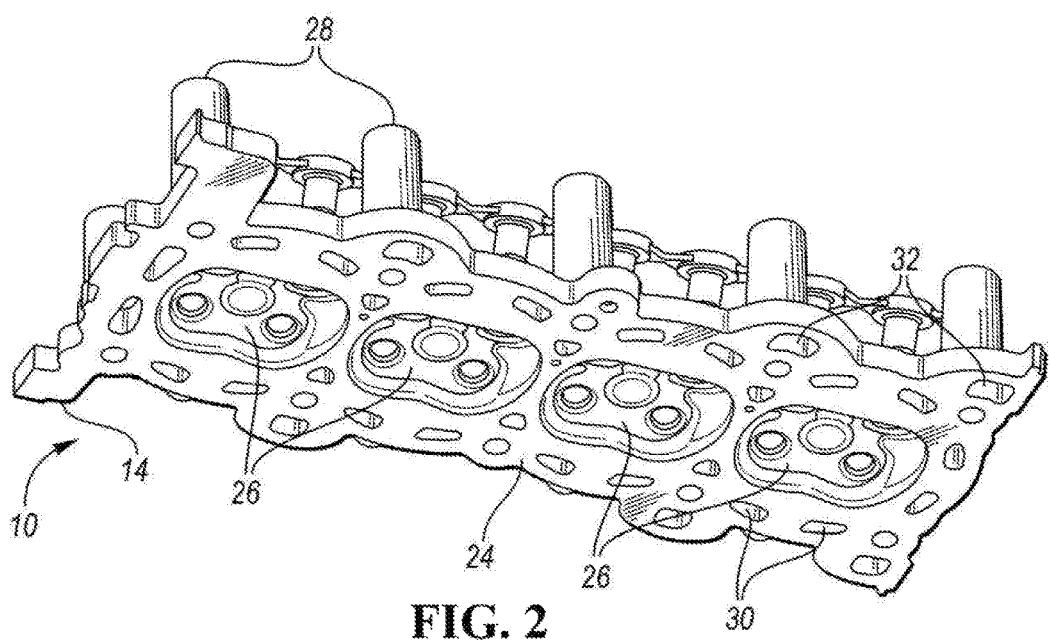
FIG. 2 depicts an alternative view of the internal metal structure shown in FIG. 1.

As can be seen in FIGS. 1 and 2, the internal metal structure 10 may be a section forming an upper portion of a combustion chamber. The internal metal structure 10 may include a combustion chamber insert 14. As illustrated in FIGS. 1 and 2, the internal metal structure 10 may contain the following components of the cylinder head: one or more valve stem guides 16, an exhaust face 18, one or more intake valve spring seats 20, one or more exhaust valve spring seats 22, a fire deck 24, one or more domes of one or more combustion chambers 26, one or more head bolt columns 28, or a combination thereof. The fire (head) deck 24 may include one or more intake and/or exhaust ports, which are passages cast into the internal metal structure 10 of the cylinder head 100 leading from manifolds to respective valves. As can be seen in FIG. 2, the fire deck 24 may include a plurality of engine coolant ports 30 and a plurality of oil drain ports and crankcase vents 32.

It is contemplated that at least some of the above-mentioned components could be included in the external polymer composite structure 12 instead of the internal metal structure 10. However, it is desirable to provide at least some of the parts, such as the fire deck 24 and the exhaust face 18, as part of the internal metal structure 10 because the fire deck 24 and the exhaust face 18 may be exposed to temperatures and pressure higher than the composite material may withstand. Additionally, the inclusion of one or more of the above-mentioned components in the internal metal structure 10 allows for reduction or prevention of fatigue failure of the cylinder head due to exposure to alternating stresses. The internal metal structure 10 is capable of carrying a static and dynamic load while the external polymer composite structure 12 is not required to carry a static load. The head bolt columns 28 mitigate a static load imparted by the metal material. Further still, forming one or more of the above-mentioned components from metal has further advantages. For example, the fire deck 24 adds structural stiffness, structural flatness, and sealability to the internal metal structure 10, as well as maintains the dimensional stability of one or more domes of the combustion chambers 26.

The internal metal structure 10 may be made from aluminum, texturized aluminum, cast iron, CGI iron, steel, or another metal, depending on the specific engine application. The internal metal structure 10 may be made from one or more alloys. For example, the internal metal structure 10 may be made from an aluminum alloy comprising copper, silicon, manganese, magnesium, the like, or a combination thereof. An addition of silicon and/or copper reduces thermal expansion and contraction, durability, and castability of the internal metal structure 10. An addition of copper promotes age-hardening. An addition of manganese and/or magnesium improves strength of the alloy. Because the internal metal structure 10 forms a portion of a combustion chamber 14, the material of the internal metal structure 10 has to withstand increase in temperature and pressure during the combustion process. The type of material used for the internal metal structure 10 may be adjusted depending on the needs of a specific application such as required performance, peak pressure, duty cycle, the like, or a combination thereof.

The external polymer composite structure 12 may be formed from a composite material and at least partially surround the internal metal structure 10 of the cylinder head. The external polymer composite structure 12 may include reinforced polymer material. The external polymer composite structure 12 may include a thermoplastic material. The external polymer composite structure 12 may include a thermoset resin. The thermoset resin may include a polyester resin, an epoxy resin, a phenolic resin, a polyurethane, a polyimide, a silicone, or other type of resins, and combination thereof. The external polymer composite structure 12 may be reinforced with a fibrous material. The external polymer composite structure 12 may include fiber-reinforced polymers. For example, the external polymer composite structure 12 may be reinforced with carbon fiber, aramid fiber, glass, basalt, the like, or a combination thereof. The external polymer composite structure 12 may be reinforced with lignocellulosic fibers such as cotton, wool, flax, jute, coconut, hemp, straw, grass fiber, and other fibers available directly from natural sources, as well as chemically modified natural fibers, for example chemically modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. These lists of natural fibers are illustrative and not limiting. Examples of chemically modified fibers also include azlon (regenerated natural proteins), regenerated cellulose products including cellulose xanthate (rayon), cellulose acetate, cellulose triacetate, cellulose nitrate, alginate fibers, casein-based fibers, and the like.

In one or more embodiments, the external polymer composite structure 12 includes a thermoset resin reinforced with carbon fibers to increase stiffness, provide the desired weight reduction, excellent fatigue resistance, and chemical resistance. Carbon fibers are also suitable due to their high strength-to-weight and stiffness-to-weight ratio. However, any type of fiber is suitable and a specific composition of the composite material depends on a particular engine application.

Figure 3:
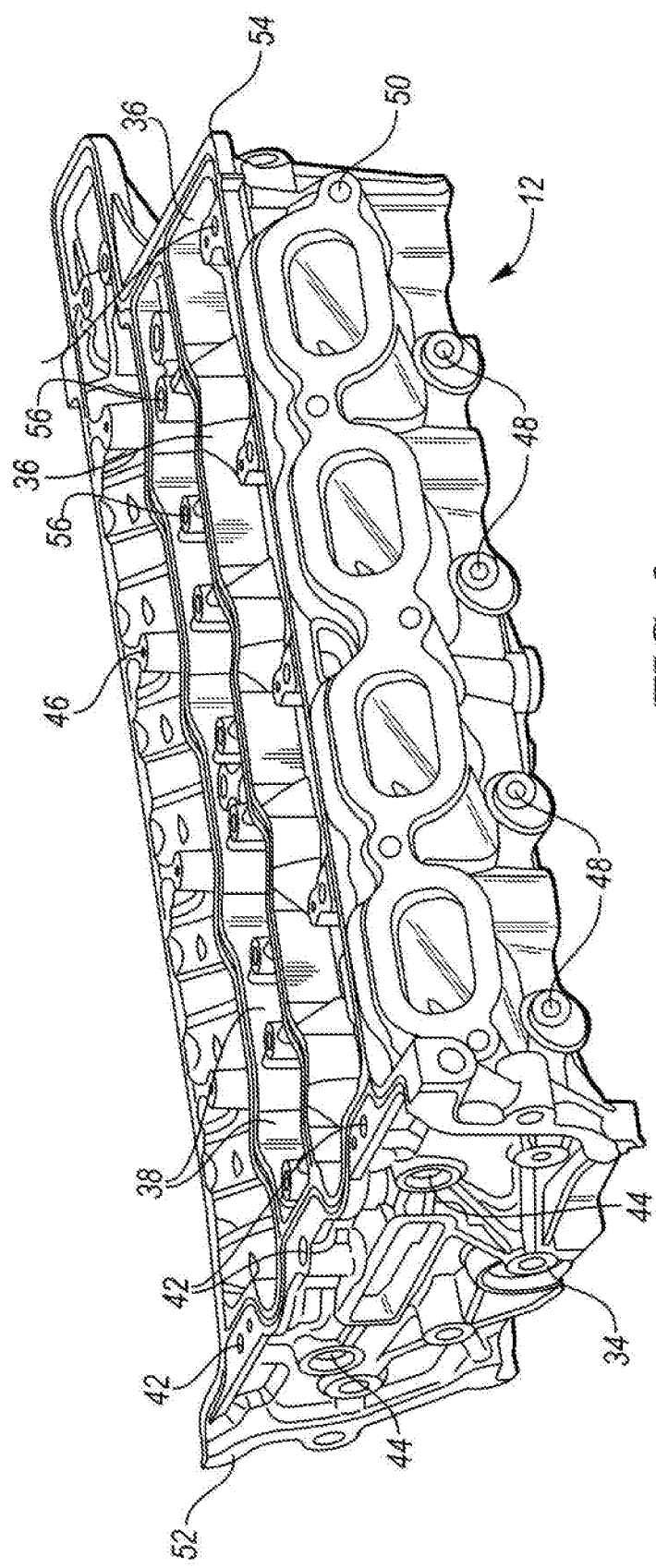
FIG. 3 depicts a perspective side view of a composite external structure of a hybrid composite cylinder head in accordance with one or more embodiments.

As is illustrated in FIG. 3, the external polymer composite structure 12 may include a plurality of components. In one or more non-limiting embodiments, the external polymer composite structure 12 may include one or more water jacket core supports 34, one or more intake valve spring pockets 36, one or more spark plug and direct injection pockets 38, one or more fuel pump pedestal pockets 40, one or more oil feeds to the cam 42, one or more intake and exhaust oil feeds 44 for a hydraulic lash adjuster, cam bearing oil feeds 46, one or more side direct injection mounting ports 48, one or more intake mounting bosses 50, a front cover seal rail 52, a cam carrier mounting rail 54, and/or one or more cam carrier mounting bosses 56. It is contemplated that other parts of a cylinder head may be a part of the external polymer composite structure 12. For example, intake manifolds or a base head (not depicted) could be included in the external polymer composite structure 12.

In one or more embodiments, the method of making the composite cylinder head 100 includes the following steps. While the described method refers to the cylinder head 100, the process is likewise applicable to the hybrid cylinder heads 200, 300, and 400 as well as their individual portions. The internal metal structure 10 may be manufactured as one unit, for example by additive manufacturing, casting, monocasting, molding, welding, or forming by another method. Alternatively, individual portions of the hybrid composite cylinder head 100 may be produced separately and the internal metal structure 10 may be assembled from the individual portions. Preferably, the individual portions of the cylinder head 100 are molded together to form a uniform combustion chamber insert 14. For example, producing the fire deck 24 by monocasting or molding together with one or more additional portions as part of the combustion chamber insert 14 offers improved rigidity, strength, and flatness control.

Once the internal metal structure 10 is cast or otherwise produced, it is desirable to at least partially machine the internal metal structure 10. For example, the internal metal structure 10 may be machined to create one or more locators or other features which help to hold the internal metal structure 10 in place during thermosetting.

An additional concern to consider while producing the hybrid composite cylinder head 100 is that the internal metal structure 10 expands and shrinks faster than the external polymer composite structure 12. Therefore, the internal metal structure 10 could disengage from the external polymer composite structure 12 during use of the cylinder head 100. Thus, it is desirable in at least one embodiment to increase surface area of at least some areas of the internal metal structure 10. The surface area may be increased by adding texture to at least some areas of the internal metal structure 10. This can be done by a variety of methods, for example by roughening, serrating, micro-serrating, abrasive cutting, blasting, honing, electrical discharge machining, milling, etching, chemical milling, laser texturing, or by another process, or a combination thereof. At least in one embodiment, texture is added to the surface of the head bolt columns 24, which improves bond strength between the internal metal structure 10 and the composite material of the external polymer composite structure 12. The step of adding texture to a surface of the internal metal structure should be performed before the internal metal structure 10 is inserted into a dye and before the internal metal structure 10 is overmolded by the composite material.

Furthermore, it is contemplated that the internal metal structure 10 may be subjected to additional treatment. In one or more embodiments, a coating ensuring better thermal management is applied to one or more surfaces of the internal metal structure 10 of the hybrid composite cylinder head 100 which is exposed to hot gasses. The coating may be applied selectively such that only one or more portions of the internal metal structure are coated. Coating may be provided by painting, spraying, printing, dip coating, or a combination thereof. A mask may be used to ensure precise application of the coating to a certain portion of the internal metal structure.

Subsequently, the internal metal structure 10 is inserted in the dye of the molding machine. The internal metal structure 10 is tempered. The dye is closed. The composite material of the external polymer composite structure 12 is supplied into the dye. The external polymer composite structure 12 is formed by molding during which the composite material cures. The composite material is being molded over the internal metal structure 10 placed in the dye. The composite material may be molded by injection molding, compression molding, spin casting, or another molding method. The cure may be induced by heat of about 200° C. or more, by a chemical reaction, irradiation, or a combination thereof. The curing process transforms the thermosetting plastic to a hardened thermoset resin which has taken its final shape due to a cross-linking process. One or more catalysts and/or energy can be added during the reaction to cause the molecular chains to react at chemically active sites and link into a rigid 3-D structure which cannot be reheated to change its shape. After curing, the external composite polymer structure 12 is well suited for high-temperature applications.

Figure 4:
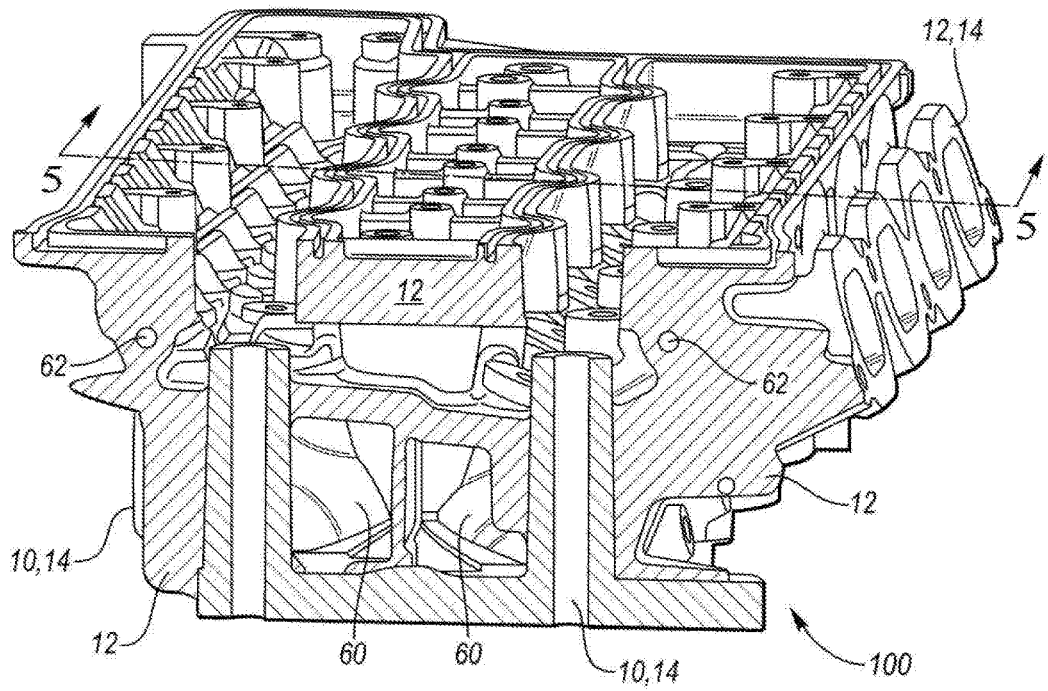
FIG. 4 depicts a perspective front cross sectional view of an assembled hybrid composite cylinder head including the internal metal structure of FIG. 1 and the composite exterior structure of FIG. 3.
Figure 5:
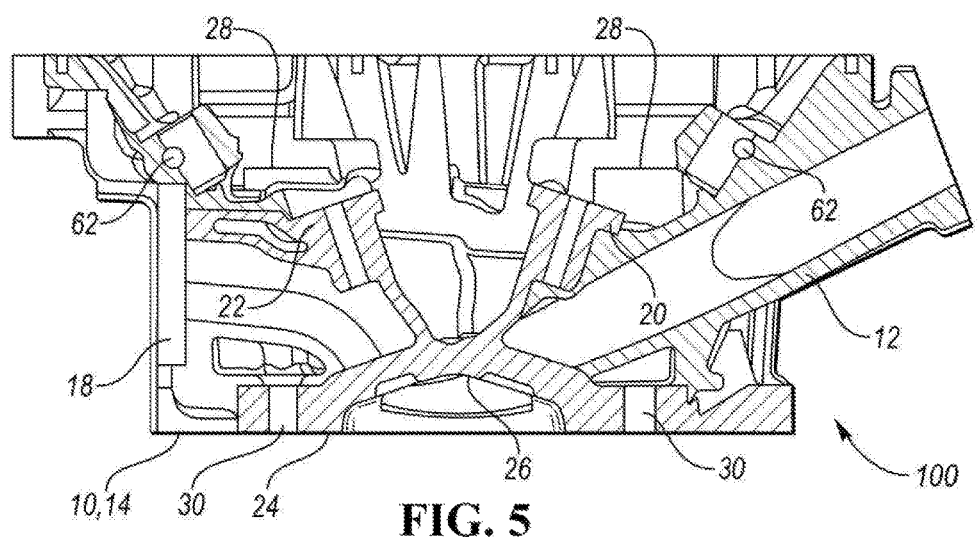
FIG. 5 shows a perspective cross sectional view taken along line 5-5 of FIG. 4.

In at least one embodiment, as illustrated in FIGS. 4 and 5, the resulting combustion chamber insert 14 is molded into the external composite polymer structure 12. The temperature is subsequently lowered, the dye opened, the hybrid composite cylinder head 100 taken out and set at room temperature.

FIG. 4 illustrates the internal metal structure 10 and the external polymer composite structure 12 assembled in such a way as to create a water-tight seam to seal the cylinder head water jackets 60 within the cylinder head 100 assembly. As can be seen in FIG. 4, the water jackets 60 are molded as part of the external polymer composite structure 12. FIG. 5 illustrates a cross section along the line 5-5 of FIG. 4. As can be seen in FIGS. 4 and 5, the internal metal structure 10 is at least partially surrounded by the external polymer composite structure 12. FIG. 5 shows the following parts of the internal metal structure 10: a combustion chamber 26, two head bolt columns 28, the exhaust face 18, one intake valve spring seat 20, one exhaust valve spring seat 22, and two engine coolant ports 30 molded as part of the external polymer composite structure 12. The openings 62 in the composite material house an oil circuit.

A machine to produce a hybrid composite cylinder head 100 may be a machine including a cast or a mold for production of the internal metal structure 10 according to the method described above. An additional machine includes a mold machine for injection molding, compression molding, spin casting, or another molding technique for molding the composite material at least partially over the internal metal structure 10 according to the method describe above.

Figure 6:
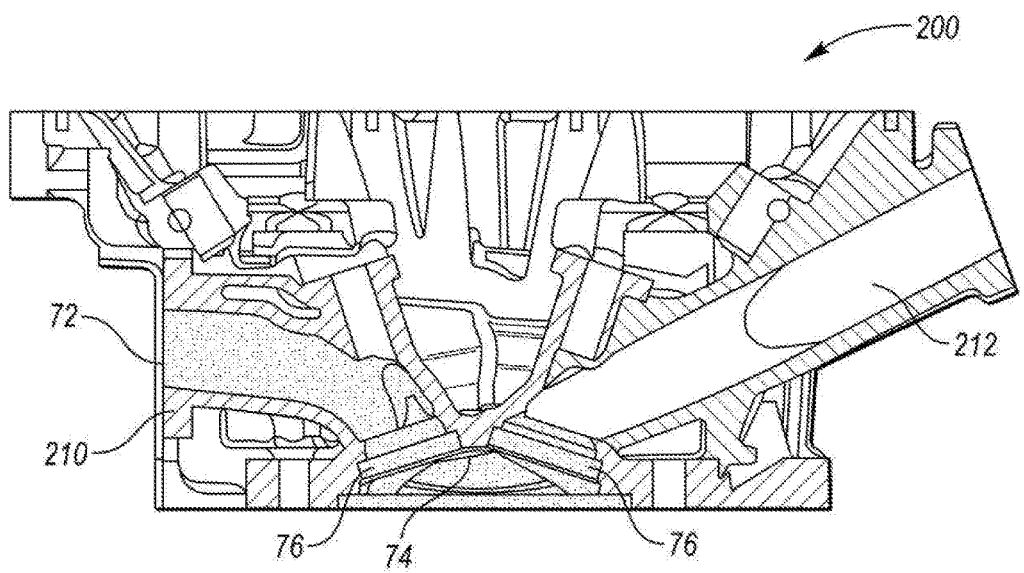
FIG. 6 shows a cross sectional view taken along line 5-5 of FIG. 4 of an alternative embodiment, depicting a coating on portions of the internal metal structure.
Figure 7:
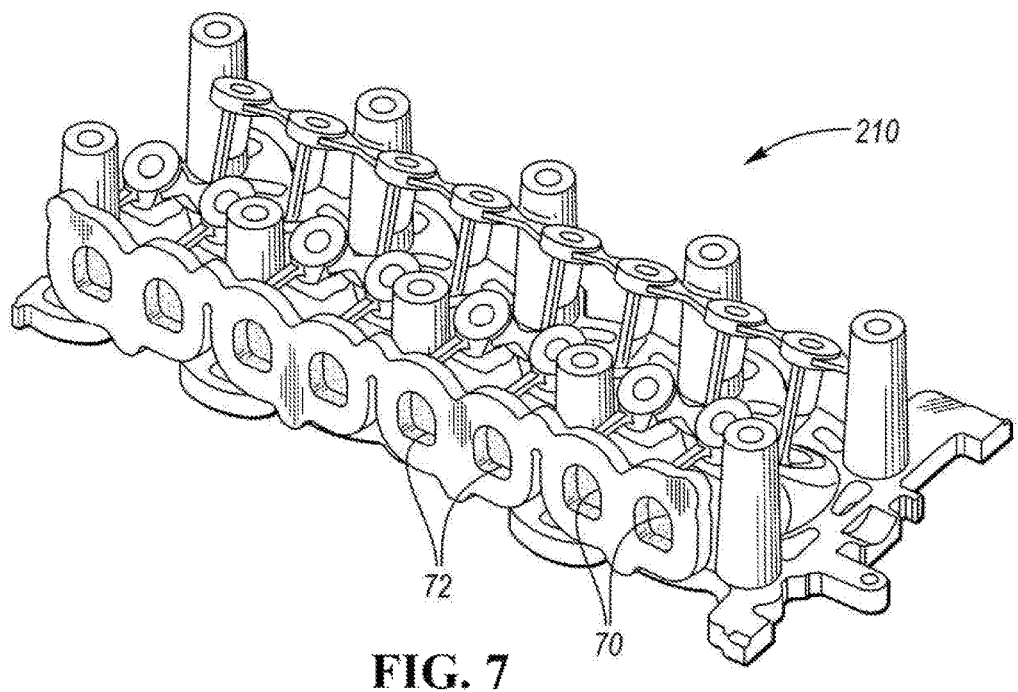
FIG. 7 shows a perspective side view of an alternative embodiment of the internal metal structure including a coating.

To even further lower the mass of the hybrid cylinder head and to further improve thermal properties of the hybrid cylinder head, a coating may be implemented on one or more portions of the internal metal structure. An alternative example hybrid cylinder head 200 is depicted in FIGS. 6 and 7, where coating 70 is depicted on a number of portions of the internal metal structure 210.

The coating 70 may be a thermal coating designed to limit thermal exposure of the structural components of the hybrid cylinder head 200 to extend the life of the cylinder head 200 by reducing oxidation and thermal fatigue. The coating 70 is also designed to maintain heat energy in the portions of the hybrid cylinder head 200, where the heat preservation is desirable and thus prevents heat loss. The coating 70 may assist with exhaust heat management. For example, the coating 70 may assist with trapping heat in the exhaust ports 72 and their surfaces depicted in FIG. 7. Maintaining the heat in the exhaust ports 72 may result in better conversion of the exhaust species and thus overall reduction of exhaust emissions released into the atmosphere. Thus, while the coating 70 may be applied anywhere within the internal metal structure 210, it is desirable to coat the portions of the internal metal structure 210 which are prone to heat exposure.

Additionally, the coating 70 may enable reduction of wall thickness since the coating 70 enables protection of skin surface, minimizes loading, and heat rejection. The coating 70 may thus further enable mass reduction as the individual coated components of the internal metal structure 210 may be formed thinner, formed from lesser amount of material as the coating 70 may compensate for the reduced thickness.

Furthermore the coating 70 may assist with keeping the heat away from the external polymer composite structure. While the coating 70 has been described on the internal metal structure, it is possible to further include the coating 70 or another coating on at least one or more portions of the external polymer composite structure. Application of such a coating on the polymer composite could be for example via plasma deposition such as plasma spraying.

The coating 70 may be continuous or discontinuous on a portion of the internal metal structure 210. The coating 70 may be conformal. The thickness of the coating 70 may be uniform or differ on different portions of the internal metal structure 210. The coating 70 may be smooth or at least a portion of the coating 70 may be textured such as include ridges, valleys, peaks, protrusions, spikes, or the like.

In at least one embodiment, about 5, 10, 15, 20, 25, 30, 35, 40, 45, 50, 55, 60, 65, 70, 75, 80, 90, 95, or more % of the inner metal structure 210 may be coated with the coating 70. For example, the entire surface of the exhaust ports 72, combustion chamber 74, or the like, may be coated.

The coating 70 of the same composition may be used on different portions of the internal metal structure 210. Alternatively, two or more coatings 70 of different compositions may be implemented such that for example, a first coating's composition differs from a composition of a second coating. Besides composition, the first and second coating may differ in dimensions such as thickness, (dis)continuity, or the like. The first coating 70' and the second coating 70" may be temporarily or permanently in contact with each other. Additional coatings such as a third, fourth, etc. coatings are contemplated.

The coating 70 may be several one ten thousandths of an inch to several thousandths of an inch thick. For example, the thickness of the coating 70 may be 0.0001 to 0.01 inch, 0.0005 to 0.005, or 0.001 to 0.0025.

Example materials for the coating 70 may be ceramic including crystalline ceramic materials, non-crystalline ceramics, alumina, mullite comprising alumina and silica, ceria, silicon carbide, silicon nitride, tungsten carbide, titanium carbide, kaolinite, barium titanate, bismuth strontium calcium copper oxide, boron oxide, boron nitride, lead zirconate titanate, magnesium diboride, silicon aluminum oxynitride, yttrium barium copper oxide, yttrium-stabilized zirconia (YSZ), zinc oxide, zirconium dioxide, rare-earth zirconates, rear earth oxides, metal-glass composites, or a combination thereof. Other example materials for the coating 70 may include molybdenum, titanium, nickel, copper, alloy such as alloys of nickel, chrome, molybdenum, high-performance superalloys such as Hastelloy®, Incoloy®, Inconel®, Stellite®, the like, or a combination.

Example application of the coating 70 can be seen in FIG. 6, which depicts a cross section of the hybrid cylinder head 200. The inner metal structure 210 includes several portions coated with the coating 70. As can be seen, the coating 70 is applied in the exhaust port surfaces 72 as well as the combustion chamber 74. In addition, the valve seat inserts 76 also include the coating 70. In FIG. 7, the exhaust ports 72 are depicted with the coating 70.

Figure 8:
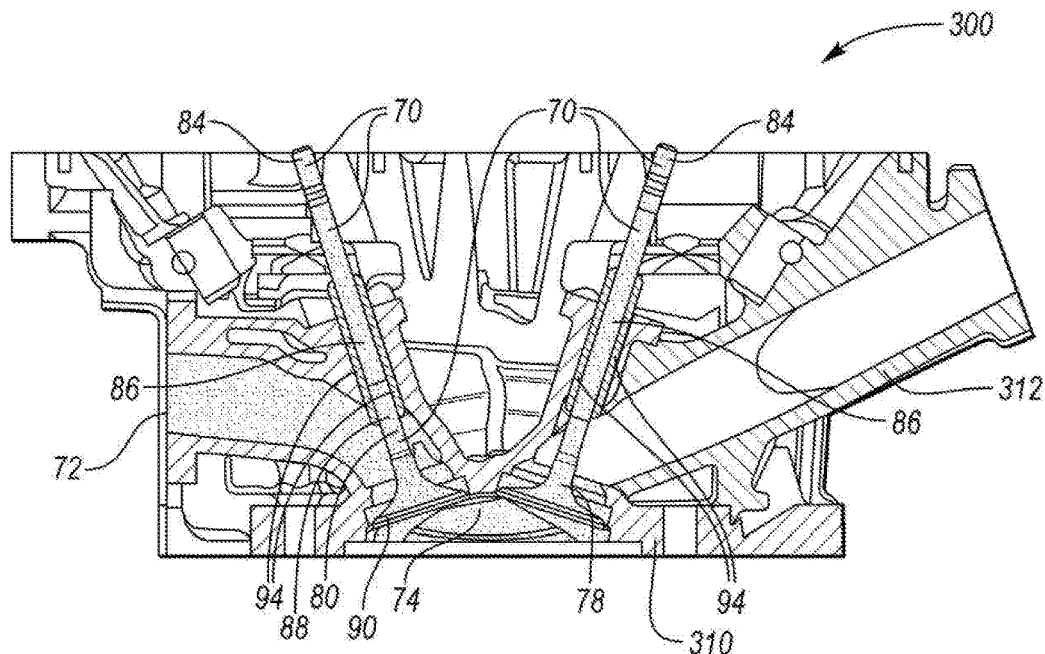
FIG. 8 shows another alternative embodiment of FIG. 6 including valves.

In at least one embodiment, the hybrid composite cylinder head 300 may include the intake valves 78 and the exhaust valves 80, at least one of which may be at least partially coated with the coating 70. For example, as is depicted in FIG. 8, the exhaust valve 80 as well as the intake valve 78 include the coating 70. The exhaust valve 80 may include larger percentage of coated surfaces than the intake valve 78 to focus the coating 70 on the areas most affected by the heat.

Figure 9:
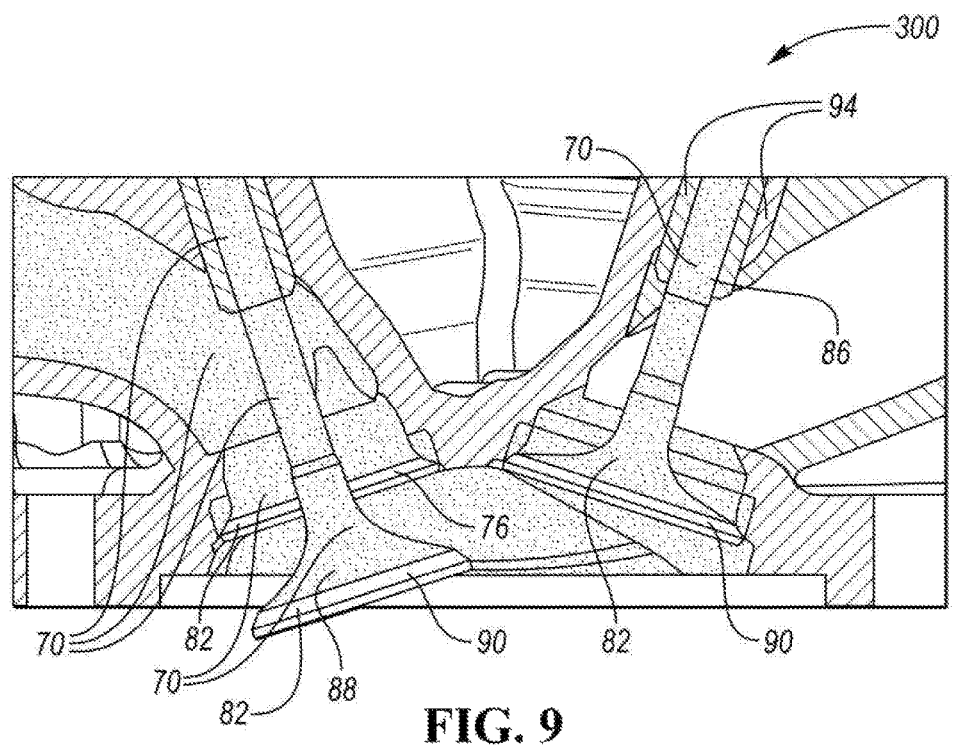
FIG. 9 illustrates a detailed view of a portion of FIG. 8 depicting the valve heads.
Figure 10:
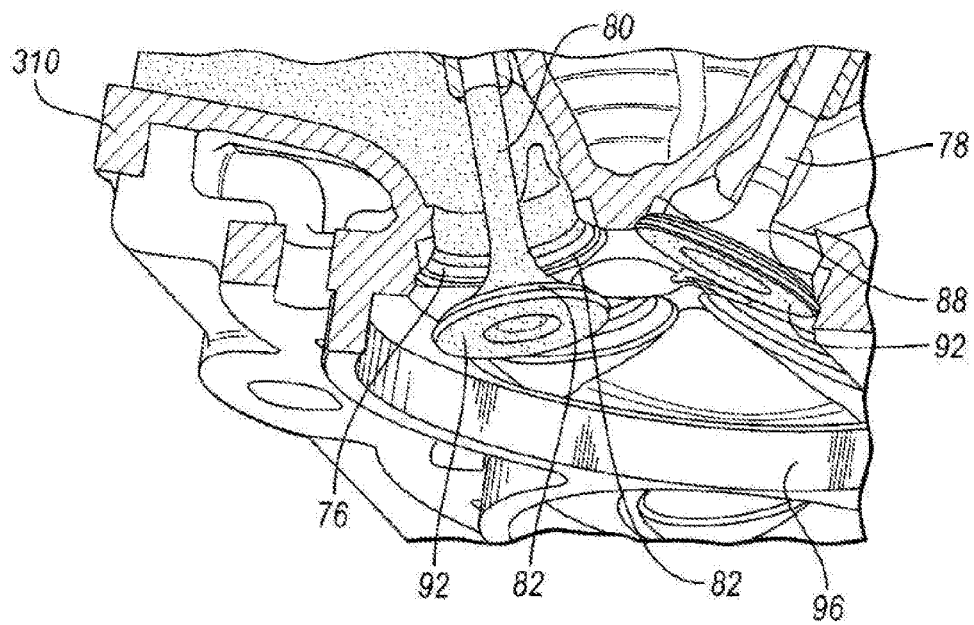
FIG. 10 shows an alternative view of the hybrid composite head showing valve head faces and a portion of an alignment feature; and partially thermal coated intake and exhaust valves and seat inserts.

At least one of the valves 78, 80 may include a coating 70 on one or more of the following portions depicted in FIGS. 8-10: top portion of valve stem 84, valve stem 86, valve head 88, for valve seating surface 90, valve head face 92, or a combination thereof. The entire surface or a section of each named portion 84-92 may be covered with a coating 70.

FIG. 8 further illustrates the concept of applying more than one coating 70 on one or both valves 78, 80. For example, the valve guide running surfaces 84 are left coating-free on both valves 78, 80. Both valves include a first coating 70' on the valve stem 86 to reduce wear and provide additional lubricity/reduce friction between the valve stem 86 and the valve guide running surfaces 94. The exhaust valve 80 further includes a second coating 70" on the valve head surface 88 with the exception of the valve seating surface 90. The first coating 70' applied to the surface of the exhaust valve 80 has different dimensions than the first coating 70' applied to the surface of the intake valve 78.

In one or more embodiments, portions of the valve surface may remain free of the coating 70. As can be seen in FIG. 9, the valve head 88 of the intake valve 78 may be free of the coating 70. Similarly, valve seating surface 90 of the exhaust valve 80 may remain free of the coating 70 for example, for maximum heat transfer through internal metal structure to the water jacket/cooling system. As can be further seen in FIGS. 9 and 10, a valve seat insert 76 of the exhaust valve 80 may remain free of the coating 70 to maximize the heat transfer. Alternatively, only a portion of the valve seating surface 90, the valve seat insert 76, or both may remain free of the coating 70. The surface free of coating 70 may have any size, shape, configuration such as a circle, stripe, rectangle, square, or the like. Alternatively, the valve seating surface 90 and the valve seat insert 76 may be coated with the coating 70. Alternatively still, the coated 70 and uncoated surface 82 may alternate in a pattern or randomly, for example the coated surface 70 may have a shape of a rectangle adjacent to a rectangle-shaped uncoated surface 82, adjacent to a rectangle-shaped coated surface 70, etc.

In one or more embodiments, providing all-ceramic valves is contemplated. Alternatively, the entire surface of the one or both valves 78, 80 may be coated with the coating 70 such as a ceramic coating. Alternatively, the one or both valves 78, 80 may be made from a metal such as titanium, and the coating may be made from one or more materials named above such as molybdenum.

Figure 11:
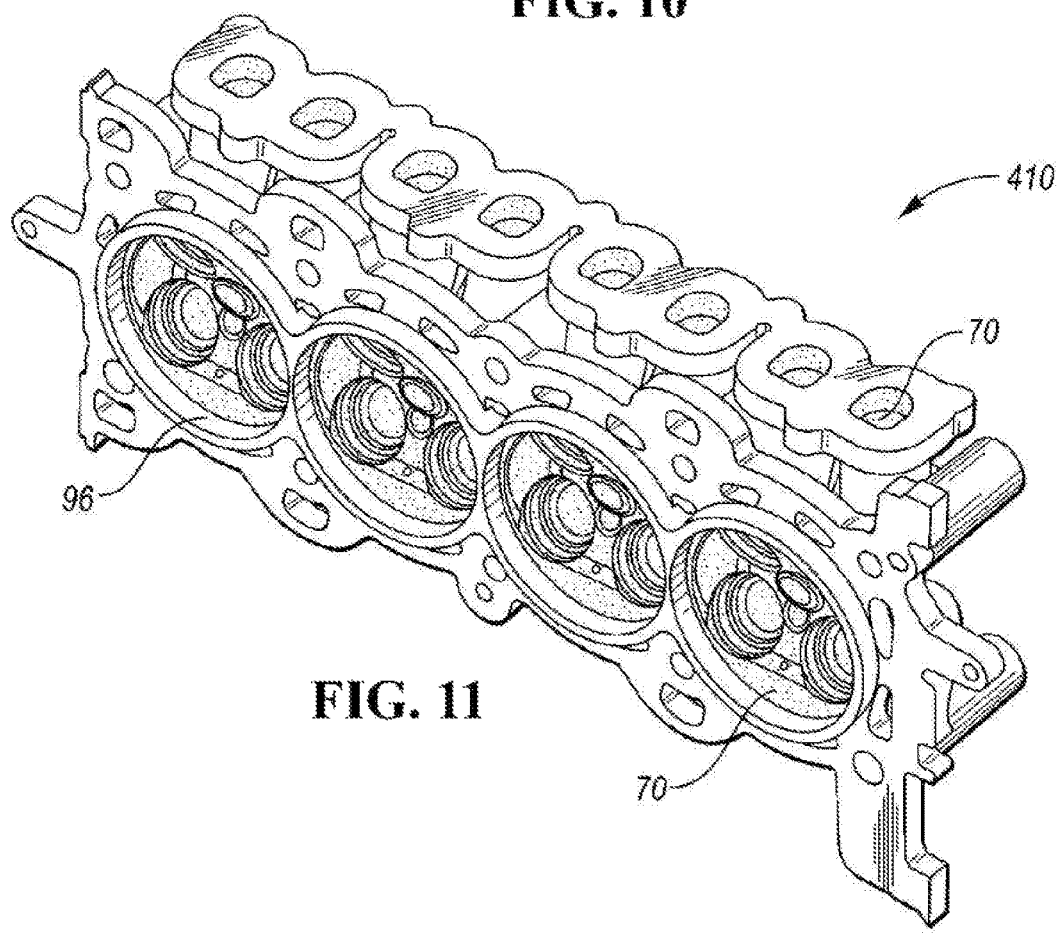
FIG. 11 shows a perspective view of a yet alternative embodiment of the internal metal structure including an alignment feature.

In a yet another embodiment, the internal metal structure 310, 410 may include the coating 70 in addition to a bore support and cooling bridge alignment feature 96, an example of which is displayed in FIGS. 10 and 11. The feature 96 may provide attachment capability to the engine block. For example, the feature 96 may have a groove, crease, tongue, protrusion or another female part matching a male part of the block such that the hybrid cylinder head disclosed herein may be attached, secured, fit onto the engine block.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine cylinder head comprising:
   an internal metal structure formed from a metal material, at least a portion of which includes a thermal coating; and
   an external polymer composite structure formed from a polymer composite material and defining at least one of an oil intake feed, an exhaust oil feed, a cam oil feed, and a cam bearing oil feed,
   wherein the external polymer composite structure at least partially surrounds the internal metal structure.

2. The engine cylinder head of claim 1, wherein the internal metal structure includes a fire deck with an exhaust port surface and the thermal coating covers the exhaust port surface.

3. The engine cylinder head of claim 1, wherein the internal metal structure forms a combustion chamber coated with the thermal coating.

4. The engine cylinder head of claim 1, wherein the internal metal structure includes a valve seat insert coated with the thermal coating.

5. The engine cylinder head of claim 1, further including a valve.

6. The engine cylinder head of claim 5, wherein at least a portion of the valve includes a thermal coating.

7. The engine cylinder head of claim 6, wherein an entire surface of a valve head face of the valve includes the thermal coating.

8. The engine cylinder head of claim 5, wherein an entire valve and its surfaces are made from ceramic.

9. The engine cylinder head of claim 1, wherein the thermal coating is a ceramic coating.

10. The engine cylinder head of claim 1, wherein the external polymer composite structure is made from a thermoset resin.

11. An engine cylinder head comprising:
    an internal metal structure formed from a metal material;
    an external polymer composite structure formed from a polymer composite material and defining a water jacket; and
    an exhaust valve and an intake valve,
    wherein at least a portion of the internal metal structure and at least a portion of the exhaust valve, the intake valve, or both includes a first thermal coating, a second thermal coating, or both.

12. The engine cylinder head of claim 11, wherein the first thermal coating is ceramic and the second thermal coating has a different chemical composition than the first thermal coating.

13. The engine cylinder head of claim 12, wherein the intake valve and a seating surface of the exhaust valve are free from the first thermal coating.

14. The engine cylinder head of claim 12, wherein a valve head face and a valve stem of the exhaust valve include the first thermal coating.

15. The engine cylinder head of claim 12, wherein both the exhaust valve and the intake valve include the second thermal coating arranged on a valve stem surface between an upper portion of a valve head and a valve guide running surface.

16. The engine cylinder head of claim 15, wherein a length of the surface covered with the second thermal coating is greater on the exhaust valve than on the intake valve.

17. An engine cylinder head comprising:
- an internal metal structure formed from a metal material, the internal metal structure including thermal-coated exhaust ports and a thermal-coated combustion chamber insert;
- an external polymer composite structure formed from a polymer composite material at least partially surrounding the internal metal structure, and including intake and exhaust oil feeds for a hydraulic lash adjuster; and
- a bore support and cooling bridge alignment feature framing the combustion chamber insert.

18. The engine cylinder head of claim 17 further including an exhaust valve and an intake valve, at least a portion of each being thermal-coated.

19. The engine cylinder head of claim 17, wherein the thermal coating is a ceramic coating.

* * * * *